(12) United States Patent
Belpaire et al.

(10) Patent No.: US 10,538,277 B2
(45) Date of Patent: Jan. 21, 2020

(54) STRUCTURAL REINFORCEMENT SYSTEM

(71) Applicant: SIKA TECHNOLOGY AG, Baar (CH)

(72) Inventors: Vincent Belpaire, Uccle (BE); Dominique Mellano, Petit-Roeulx lez Braine (BE); Yves Vandenberg, Meslin-L'eveque (BE)

(73) Assignee: SIKA TECHNOLOGY AG, Baar (CH)

( * ) Notice: Subject to any disclaimer, the term of this patent is extended or adjusted under 35 U.S.C. 154(b) by 175 days.

(21) Appl. No.: 15/417,700

(22) Filed: Jan. 27, 2017

(65) Prior Publication Data

US 2017/0203796 A1  Jul. 20, 2017

Related U.S. Application Data

(63) Continuation of application No. 13/058,718, filed as application No. PCT/EP2009/060431 on Aug. 12, 2009, now Pat. No. 9,555,840.

(30) Foreign Application Priority Data

Aug. 12, 2008 (EP) .................................... 08162226

(51) Int. Cl.
*B62D 29/00* (2006.01)
*B62D 25/02* (2006.01)
(Continued)

(52) U.S. Cl.
CPC ........... *B62D 29/001* (2013.01); *B62D 21/09* (2013.01); *B62D 25/025* (2013.01); *B62D 25/04* (2013.01);
(Continued)

(58) Field of Classification Search
None
See application file for complete search history.

(56) References Cited

U.S. PATENT DOCUMENTS 5,944,373 A   8/1999  Seksaria et al.
6,247,287 B1  6/2001  Takabatake
(Continued)

FOREIGN PATENT DOCUMENTS

DE   202004009473 U1   10/2004
EP        1074457 A2    2/2001
(Continued)

OTHER PUBLICATIONS

Office Action (Notice of Decision for Rejection) dated Jul. 12, 2017, by the Korean Intellectual Property Office in corresponding Korean Patent Application No. 10-2016-7016034, and an English Translation of the Office Action. (5 pages).
(Continued)

*Primary Examiner* — David Sample
*Assistant Examiner* — Nicole T Gugliotta
(74) *Attorney, Agent, or Firm* — Buchanan Ingersoll & Rooney PC (57) ABSTRACT

Disclosed are various embodiments of a structural reinforcement system. The system reinforces hollow cavities within various products to increase the structural rigidity of the product. The system generally includes a rigid carrier, a bonding material, and an insert. The rigid carrier provides the primary structural reinforcement within the cavity, and also serves as a substrate to carry the bonding material. The insert is provided to increase the structural rigidity of the reinforcement system.

18 Claims, 7 Drawing Sheets

(51) Int. Cl.
  B62D 25/04 (2006.01)
  B62D 21/09 (2006.01)
  B62D 25/08 (2006.01)

(52) U.S. Cl.
  CPC ........... B62D 25/08 (2013.01); B62D 29/002 (2013.01); B62D 29/005 (2013.01); *Y10T 428/23* (2015.01); *Y10T 428/24008* (2015.01); *Y10T 428/24628* (2015.01); *Y10T 428/24983* (2015.01)

(56) References Cited

U.S. PATENT DOCUMENTS

| 6,253,524 | B1 | 7/2001 | Hopton et al. |
| 6,595,497 | B1 | 7/2003 | Linford et al. |
| 7,367,527 | B2 * | 5/2008 | Shumate .................. B64C 1/40 244/129.1 |
| 2001/0042353 | A1 | 11/2001 | Honda et al. |
| 2004/0130185 | A1 | 7/2004 | Hasler et al. |
| 2006/0188694 | A1 | 8/2006 | McLeod et al. |
| 2008/0014388 | A1 | 1/2008 | Mett et al. |
| 2010/0117397 | A1 | 5/2010 | Richardson et al. |

FOREIGN PATENT DOCUMENTS

| EP | 1149679 | 10/2001 |
| EP | 1354789 A2 | 10/2003 |
| EP | 1759964 A1 | 3/2007 |
| JP | 10-053156 | 2/1998 |
| JP | 2001-048054 A | 2/2001 |
| JP | 2002-012167 A | 1/2002 |
| JP | 2002-127938 | 9/2002 |
| JP | 2002-362412 | 12/2002 |
| WO | WO 99/37506 A1 | 7/1999 |
| WO | WO 02/074608 A1 | 9/2002 |

OTHER PUBLICATIONS

Office Action (Communication pursuant to Article 94(3) EPC) dated Sep. 25, 2017, by the European Patent Office in corresponding European Patent Application No. 16 169 513.5-1757. (5 pages).

Office Action dated Aug. 17, 2018, by the Indian Patent Office in corresponding Indian Patent Application No. 969/KOLN/2011, and an English Translation of the Office Action. (6 pages).

International Search Report for PCT/EP2009/060431.

Notice of Decision for Rejection dated May 13, 2016 in corresponding Korean Patent Application No. 10-2011-7005206 (with English translation).

Notice of Decision on Dismissal of Amendment dated May 13, 2016 in corresponding Korean Patent Application No. 10-2011-7005206 (with English translation).

Decision of Final Rejection dated Jun. 14, 2016 in corresponding Japanese Patent Application No. 2014-151625 (with English translation).

Korean Office Action dated Sep. 30, 2016 by the Korean Intellectual Property Office in Korean Patent Application No. 10-2016-7016034 (English translation only).

Office Action dated Jul. 9, 2019, by the Brazilian Patent Office in corresponding Brazilian Patent Application No. PI0918435-0, and an English Translation of the Office Action. (7 pages).

* cited by examiner

STRUCTURAL REINFORCEMENT SYSTEM

CROSS-REFERENCE TO RELATED APPLICATIONS

This applications is a continuation application of application Ser. No. 13/058,718 filed on May 9, 2011, which claims priority to International Application No. PCT/EP2009/060431 filed on Aug. 12, 2009, and EP Application No. 08162226.8 filed on Aug. 12, 2008. The entire contents of these applications are hereby incorporated by reference in their entireties.

Cars, trucks, boats, trains, and planes often include frames with hollow cavities. Hollow cavities are often created in these products to reduce overall weight of the product, as well as to reduce material costs. However, introducing hollow cavities into a frame may reduce the overall strength of the frame, and may also increase noise and vibration in other parts of the vehicle.

To alleviate these, as well as other negative effects, hollow cavities often include reinforcements, including various bonding materials. Such reinforcements can decrease noise and vibration while increasing the structural stiffness of the product, thereby allowing for significant weight and material cost reductions. Reinforcement systems can include bonding materials, such as an expandable foam, which is applied to a rigid carrier. The foam expands during the manufacturing process, securing the rigid carrier in place as the foam contacts the walls of the hollow cavity. Reinforcement systems can provide additional structural reinforcement, as well as other benefits, through the use of novel shapes, materials, and configurations.

SUMMARY

Disclosed are various embodiments of a structural reinforcement system. The system reinforces hollow cavities within various products to increase the structural rigidity of the product. The system generally includes a rigid carrier, a bonding material, and an insert. The rigid carrier provides the primary structural reinforcement within the cavity, and also serves as a substrate to carry the bonding material. The insert is provided to increase the structural rigidity of the reinforcement system. Additionally, the system can be configured to specifically address a particular scenario by increasing the structural rigidity of a product in a specific location and to address a particular load direction.

DETAILED DESCRIPTION

Figure 1:
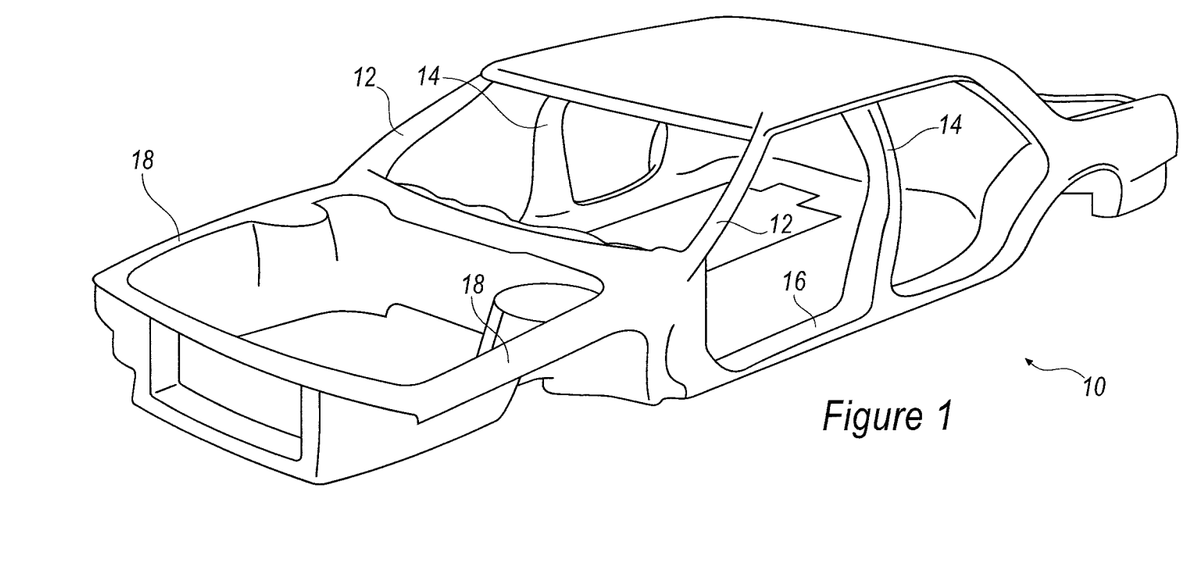
FIG. 1 is a perspective view of an automobile frame having multiple cavities.

FIG. 1 illustrates a vehicle frame 10 that includes many cavities that can be reinforced using the disclosed structural reinforcement system. Such cavities can be any size, shape, or orientation, and can be formed from any material, including various metals, composites, and/or plastics. For example, potentially reinforceable cavities within vehicle frame 10 can be found within various parts of the frame, including A-pillars 12, B-pillars 14, a rocker 16, and frame rails 18. Additional applications include C-pillars, D-pillars, roof rails, transversal beams, etc. Generally, the structural rigidity of vehicle frame 10 can be greatly enhanced by reinforcing such hollow cavities within vehicle frame 10. Of course, the disclosed structural reinforcement system can also be used in other products to increase the structural rigidity of the product, and is not limited to hollow cavities within a vehicle frame.

Figure 2:
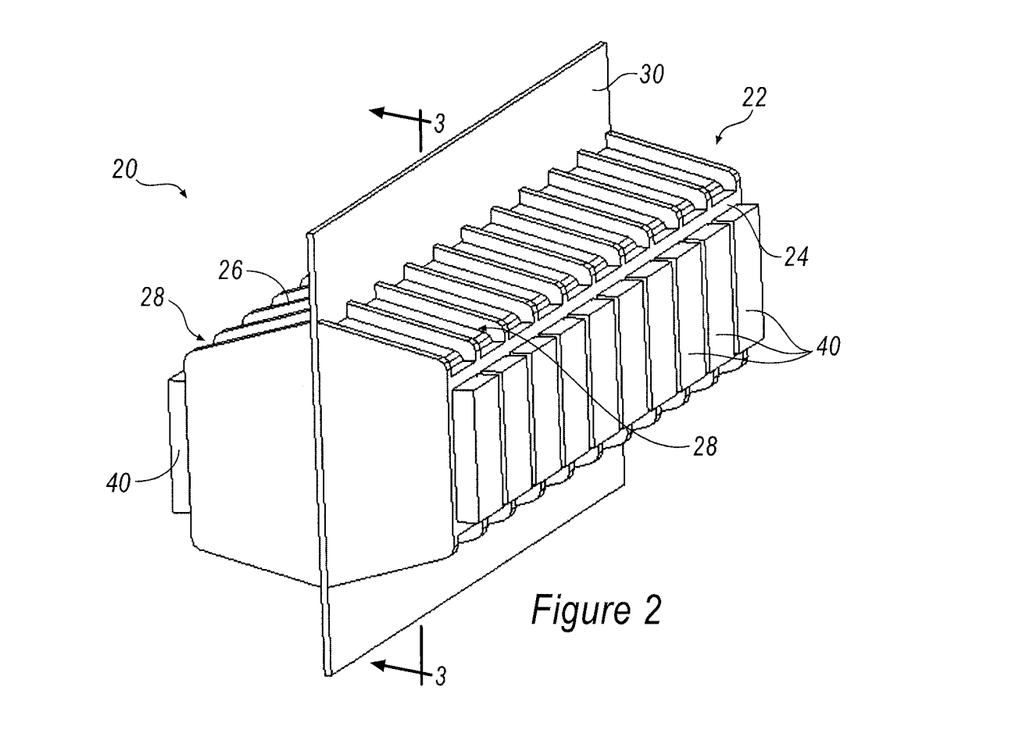
FIG. 2 is a perspective view of a structural reinforcement system.

FIG. 2 is a perspective view of a structural reinforcement system 20 for reinforcing a cavity within vehicle frame 10. A cavity can be located in any part of a product, such as within various locations of vehicle frame 10. Typically, system 20 will be designed for a specific cavity, such as within A-pillars 12, but system 20 can also be designed generically to fit cavities of differing dimensions. System 20 may be designed to fit a portion of a cavity, or may be designed to fit or fill an entire cavity. System 20 is typically a portable assembly that can be placed within a cavity during the manufacturing process. As discussed in detail below, system 20 generally includes a rigid carrier 22, an insert 30, and a bonding material 40. Of course, system 20 may also include one or more chemical or mechanical fasteners or any other element that may enhance or tailor system 20 to a particular application.

Carrier 22 is usually a rigid structure that provides structural reinforcement within a cavity, and provides a base or substrate for bonding material 40. Carrier 22 can be formed of a singular material, or it can be formed as separate components that are fastened together. Carrier 22 can be made from any number of different materials, including various metals, plastics, composites, and the like, including various polyamides. Of course, the particular material or materials may also depend on the particular application, as certain design choices may be based on weight, strength, and ability to form the material into a particular shape or configuration. Carrier 22 can be formed in a variety of shapes and configurations, including portions that are cylindrical, rectangular, contoured, angled, bent, curved, and/or flat, including any number of shape combinations designed to fit within a cavity.

As shown in FIG. 2, carrier 22 includes a plurality of ribs that are evenly spaced apart, and typically connected by one or more perpendicular walls. For example, as shown in FIG. 2, carrier 22 includes a plurality of longitudinal ribs 24 that are interconnected to a plurality of transversal ribs 26. Of course, carrier 22 may be configured to include any number, shape, and configuration of ribs. Generally, each rib includes exposed vertical faces, and exposed horizontal faces positioned in close proximity to a cavity wall. Typically, a bonding material 40 is disposed on an exterior surface of carrier 22, such as the exterior surfaces of ribs 24, 26. The thickness and spacing of ribs 24, 26 may vary substantially depending on a particular application. However, ribs 24, 26 may be between 2 and 8 mm thick, and may be spaced between 20 and 40 mm apart. Of course, such design choices may be influenced by performance requirements of a particular application. Transversal ribs 24 are typically loaded in compression to reduce the chance that a cavity will deform beyond an acceptable limit in the main direction of a load or in a local area of the section. Longitudinal ribs 26 are typically loaded in tensile. Additionally, as shown in FIG. 2, ribs 24, 26 of carrier 22 are configured to provide a plurality of recesses 28 that can also be used to house bonding material 40.

Bonding material 40 can be an expandable foam, a structural foam, an adhesive, a structural adhesive, a flowable material, or some combination thereof that bonds carrier 22 to a cavity wall. Generally, bonding material 40 is disposed on carrier 22, bonding carrier 22 to a cavity wall after undergoing an activation process. Carrier 22 typically holds bonding material 40 in a holding area, such as recess 28 that can be formed in the intersections of ribs 24, 26. Bonding material 40 can be held in recess 28 using any available method, including chemical or mechanical fasteners, such as glue, adhesives, or mechanical clips. Carrier 22 generally includes at least one recess 28 to accommodate bonding material 40. As shown in FIG. 2, carrier 22 includes multiple recesses 28 that are periodically spaced throughout carrier 22, and include a portion of bonding material 40 disposed within, and protruding beyond, recess 28. However, bonding material 40 may be disposed on any surface of carrier 22 such that after activation, bonding material 40 can secure carrier 22 in place within a cavity, and typically provides additional structural reinforcement. Generally, when bonding material 40 is an expandable material or flowable material, carrier 22 is typically configured with a plurality of recesses 28. However, when bonding material 40 is a structural adhesive, carrier 22 is typically configured with one or more substantially flat outer/exterior surfaces for bonding to the structural adhesive.

Typically, carrier 22 will be made from a plastic or composite material that is easily formable into a wide variety of shapes. Generally, forming carrier 22 from plastic ensures that a cavity can be reinforced while also reducing the overall weight of the product. Additionally, plastics can be formed into complex 3-D shapes that may provide enhanced structural reinforcement though novel shapes and designs. However, such materials typically provide less structural reinforcement than metals, such as iron or steel. Metals, on the other hand, are heavier and more difficult to form into complex 3-D shapes, but typically provide more structural reinforcement than plastics or composites. Thus, system 20 can provide enhanced reinforcement of a cavity while remaining light-weight and easily formable by including one or more metal inserts 30 in various configurations, as discussed in detail below.

As further illustrated in FIG. 2, system 20 also includes an insert 30. Insert 30, as illustrated in FIG. 2, is an elongated, substantially flat plate that is disposed within carrier 22. Insert 30 can be made from a metal, while carrier 22 can be made from a rigid plastic that is overmolded around insert 30. As illustrated in FIG. 2, insert 30 is disposed longitudinally or transversally near a cavity wall opposite to a load application, typically where the system will be subjected to tensile loads. In such a configuration, system 20 benefits from the increased structural reinforcement of a metal, while simultaneously benefiting from the reduced weight and ability to form complex 3-D shapes of a plastic. Insert 30 can be located in any orientation and shaped or formed such that system 20 can reinforce a cavity of any shape and size. Additionally, insert 30 may provide additional structural reinforcement in a particular localized area and orientation in order to address a specific requirement. For example, testing data may show that a cavity deforms more than a desired amount when stressed in a certain orientation. A reinforcement system may then be augmented with an insert 30 in a specific location and orientation in order to address that particular deformation issue. As discussed in more detail below, a structural reinforcement system may be augmented with one or more inserts 30 strategically located to address specific deformation concerns or address particular customer requirements, while minimizing the amount of weight added to the overall product. Insert 30 can also be a fiber mat that can provide enhanced structural reinforcement similar to a metal. For example, a fiber mat can be a thermoformed laminate made of thermoplastic. Such a fiber mat may be formed through an overmolding process using a plastic to form a lightweight hybrid structure.

When a force is applied to a rail-shaped cavity of vehicle frame 10, such as frame rails 18, the rail tends to deform not only in a transversal direction, but a section of the rail may deform beyond an acceptable limit in the local area that receives the load. Such local deformation may adversely affect the structural integrity of an entire rail. Typically, such a rail can be reinforced using a structural reinforcement system that includes a carrier 22 and a bonding material 40. While such a reinforcement system may increase the structural rigidity of the rail while in compression, it may not necessarily increase the structural rigidity of the rail while in tension in the normal direction to the load. Insert 30 may be included in system 20 in a location and direction that is susceptible to unacceptable amounts of deformation. Since such deformation may not be limited to one area of a rail, multiple reinforcement systems 20 may be used to reinforce an entire length of a rail. Additionally, one system 20 may be used, where the one system 20 includes multiple inserts 30 that are secured to a carrier 22.

Generally, system 20 includes an insert 30, which is a metal plate of steel or aluminum that is then surrounded by carrier 22, which can be a plastic ribbed structure. System 20 can also include an expandable foam that bonds carrier 22 to one or more cavity walls. Insert 30 can be a substantially flat metal plate, or could be shaped, such as in a 'U' shape, an 'S' shape, or a 'W' shape. Additionally, by including an insert 30 made of metal, system 20 can then be welded to a metal cavity.

Figure 3:
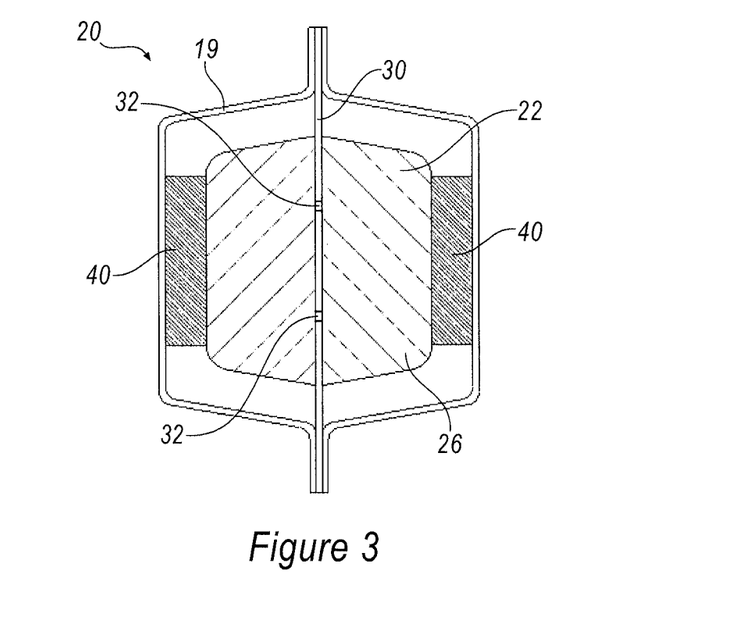
FIG. 3 is a sectional view of the structural reinforcement system of FIG. 2 taken along line 3-3 of FIG. 2.

FIG. 3 is a sectional view of structural reinforcement system 20 taken along line 3-3 of FIG. 2. As shown in FIG. 3, system 20 is configured such that bonding material 40 contacts both a cavity wall 19 and carrier 22 after expansion, thereby securing carrier 22 in place while also providing additional structural reinforcement. Typically, bonding material 40 and carrier 22 are configured to maintain a pre-expansion gap between system 20 and cavity walls 19 before activation. Providing a pre-expansion gap allows a manufacturer to apply liquid coatings to walls 42 within a cavity, such as through a dip or bath, and allows for greater assembly tolerances. Generally, system 20 is configured such that when bonding material 40 is activated, bonding material expands and contacts both carrier 22 and one or more cavity walls 19. After the activation process, bonding material 40 cures, transitioning into a substantially solid phase. Bonding material 40 can be a structural foam and thereby provide additional structural reinforcement within the cavity.

Before activation, bonding material 40 rests in an unexpanded state, possibly occupying a recess 28 within carrier 22, or disposed on an exterior surface of carrier 22. Generally, system 20 will be placed in a cavity within vehicle frame 10 during an early stage of the vehicle manufacturing process. At a later stage, vehicle frame 10 will undergo a heat treatment or baking process, such as during a painting process. Generally, bonding material 40 is a heat activated material that can expand to fill any a space between carrier 22 and cavity walls 19. While activation generally occurs by applying heat, bonding material 40 could also be activated through various other electrical or chemical processes, including using microwaves, ultrasonic waves, radiation, electric current, chemical reactions, etc.

As illustrated in FIG. 3, system 20 includes insert 30 that can be configured to mate with or be secured within cavity walls 19. Additionally, insert 30 may not contact cavity walls 19 directly, but simply be included within system 20. Insert 30 can be integrated into carrier 22 in any fashion, including different locations and orientations, possibly depending on desired performance characteristics. Carrier 22 may be a two-piece construction where two-halves are each attached to insert 30 using glue, adhesive, or a mechanical fastener. Additionally, carrier 22 could be overmolded on and around insert 30. Insert 30 can include a plurality of holes 32 that allow insert 30 to be integrally formed with carrier 22. For example, insert 30 may be placed within a plastic mold that is configured to form carrier 22. Holes 32 then would allow liquid plastic to flow through holes 32 such that carrier 22 would be formed and integrally bonded with insert 30. Following formation, bonding material 40 can then be added to carrier 22 and/or insert 30.

Figure 4A:
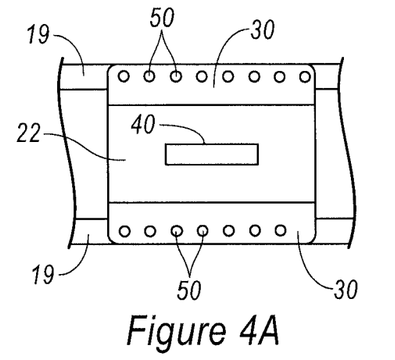
FIG. 4A is a side view of a structural reinforcement system disposed in a cavity.
Figure 4B:
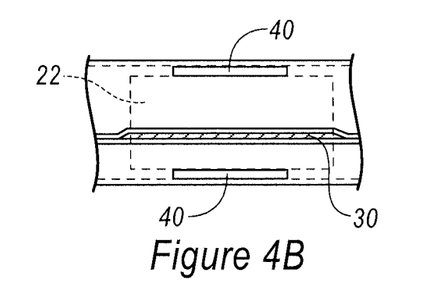
FIG. 4B is a top view of the structural reinforcement system of FIG. 4A.

FIGS. 4A and 4B illustrate one example of a structural reinforcement system 20 that includes an insert 30. FIG. 4A is a side view of system 20, illustrating that system 20 is attached to cavity walls 19 by way of insert 30. As illustrated in FIG. 4A, carrier 22 includes an insert 30 and a bonding material 40. As illustrated in FIGS. 4A and 4B, insert 30 is singular, elongated, substantially flat plate disposed within carrier 22 that spans a distance between cavity walls 19. In such an example, insert 30 can be fixed on the majority of the part length. Cavity walls 19 may also be weld seams within a cavity. Insert 30 may be made of metal and include a plurality of welding points 50 that can be used to secure system 20 to cavity walls 19 through welding. As illustrated in FIG. 4B, system 20 includes at least two deposits of bonding material 40 disposed on carrier 22.

Figure 5A:
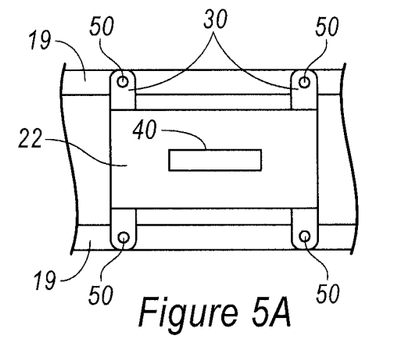
FIG. 5A is a side view of another structural reinforcement system in a horizontal cavity.
Figure 5B:
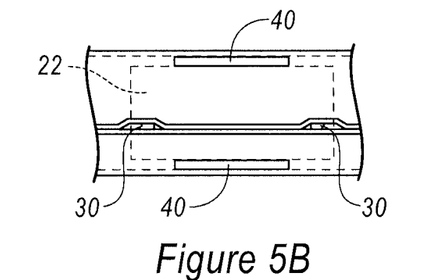
FIG. 5B is a top view of the structural reinforcement system of FIG. 5A.

FIGS. 5A and 5B illustrate an example of a structural reinforcement system 20 that includes a plurality of inserts 30. FIG. 5A is a side view of system 20, illustrating that system 20 includes two inserts 30 that are not in contact with one another, where each insert 30 is secured to carrier 22. System 20 is attached to cavity walls 19 by way of insert 30 at weld points 50. Inserts 30 are each disposed at opposing ends of carrier 22. As illustrated by way of FIGS. 5 A and 5B, each insert 30 is an elongated, substantially flat strip that spans a distance between cavity walls 19. In such an example, system 20 includes multiple localized metal inserts 30 that are secured to carrier 22. System 20 also includes at least two deposits of bonding material 40 disposed on carrier 22.

Figure 6A:
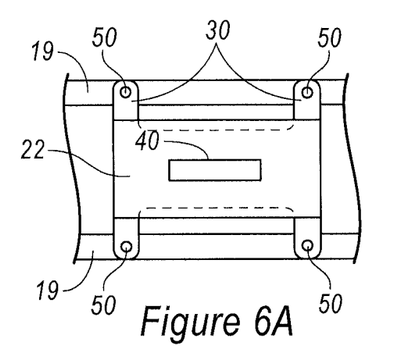
FIG. 6A is a side view of yet another structural reinforcement system in a horizontal cavity.
Figure 6B:
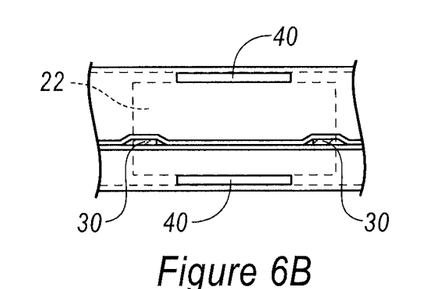
FIG. 6B is a top view of the structural reinforcement system of FIG. 6A.

FIGS. 6A and 6B illustrate another example of a structural reinforcement system 20 that includes an insert 30. FIG. 6A is a side view of system 20, illustrating that system 20 includes one insert 30 that is secured to carrier 22. System 20 is again attached to cavity walls 19 by way of insert 30 at weld points 50. As illustrated by way of FIGS. 6A and 6B, insert 30 is an elongated, substantially flat plate that is formed in an 'I' shaped configuration. Again, insert 30 spans a distance between cavity walls 19. System 20 also includes at least two deposits of bonding material 40 that are disposed on carrier 22.

A pillar, such as A-pillars 12 and B-pillars 14, generally tend to deform in one or more areas when submitted to a load. Reinforcing a pillar can be accomplished using system 20. To better address the stresses applied to pillars, system 20 may include an insert 30 made of metal placed in the longitudinal direction of the pillar and having a generally 'C', 'U', or section shape. As illustrated above, insert 30 can be disposed within carrier 22, where carrier 22 includes an array of ribs, 24, 26. Ribs 24, 26 can be disposed normal to insert 30 in both a transversal and longitudinal directions.

Figure 7:
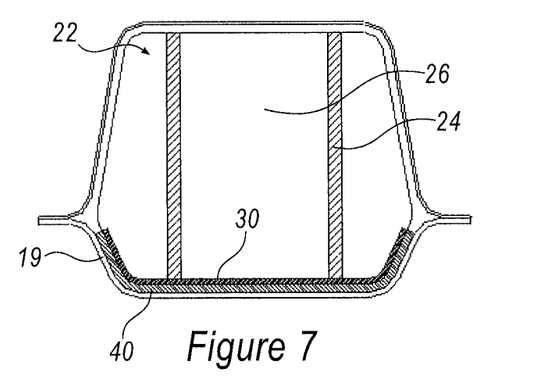
FIGS. 7-11 are cut-away views of structural reinforcement systems of varying configurations disposed in a cavity.

FIGS. 7-11 are cut-away views of structural reinforcement systems 20 of varying configurations disposed in a cavity, such as a pillar. As illustrated in FIG. 7, carrier 22 of system 20 includes a plurality of transversal ribs 26 that are separated by two longitudinal ribs 24. System 20 also includes an insert 30, and a bonding material 40. Insert 30, as illustrated in FIG. 7, is disposed within carrier 22 at an end portion of longitudinal ribs 24. Insert 30 includes upturned portions at opposite ends with a substantially flat middle section. In one example, insert 30 is a metal sheet with two upturned sections at either end, thereby substantially conforming to the shape of the cavity. In another example, insert 30 is a fiber mat that is shaped to substantially conform to the shape of the cavity. Bonding material 40 is then disposed on insert 30 such that bonding material 40 can secure system 20 within a cavity by bonding insert 30 to a cavity wall 19 after activation. In another example, an adhesive may be used to replace bonding material 40.

Figure 8:
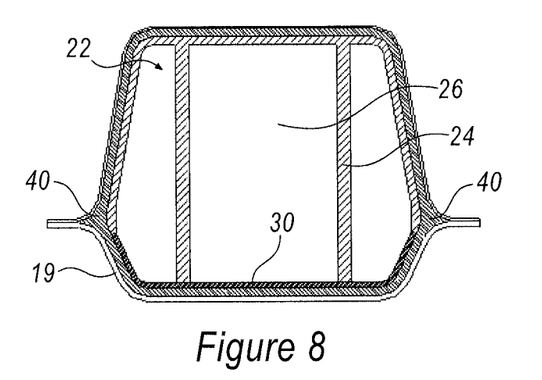

FIG. 8 illustrates another example of a reinforcement system 20. As illustrated in FIG. 8, carrier 22 includes a plurality of transversal ribs 26 that are separated by a longitudinal rib 24 that is substantially 'U' shaped and includes two additional flanged projections on either side. System 20 also includes an insert 30, and a bonding material 40. Insert 30, as illustrated in FIG. 8, is disposed within carrier 22 at an end portion of longitudinal ribs 24. Insert 30 includes upturned portions at opposite ends with a substantially flat middle section. Again, insert 30 can be a formed metal plate, and can also be a formed fiber mat. Bonding material 40 is then disposed on insert 30 and exterior surfaces of rib 24 in between carrier 22 and cavity walls 19, thereby substantially surrounding carrier 22 and insert 30.

Figure 9:
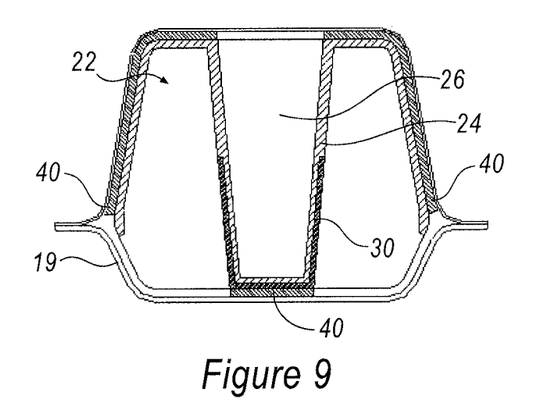

FIG. 9 illustrates another example of a reinforcement system 20, where carrier 22 includes a longitudinal rib 24 that is substantially 'W' shaped. System 20 also includes an insert 30, and a bonding material 40. Insert 30, as illustrated in FIG. 9, is disposed within carrier 22 at a middle section of rib 24, substantially conforming to the shape of rib 24. However, insert 30 is disposed along only a minor section of rib 24, covering less than one half of the area of rib 24. As illustrated, insert 30 is substantially 'U' shaped and disposed on an exterior surface of rib 24 in between carrier 22 and a cavity wall 19. Again, insert 30 can be a formed metal plate, and can also be a formed fiber mat. Bonding material 40 is then disposed in at least three locations. For example, bonding material 40 is disposed on a section of insert 30, and on sections of rib 24 in between carrier 22 and cavity walls 19, thereby partially surrounding carrier 22 and insert 30.

Figure 10:
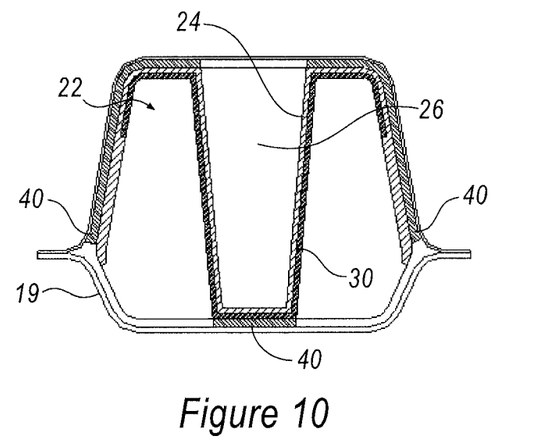

FIG. 10 illustrates another example of a reinforcement system 20, where carrier 22 includes a longitudinal rib 24 that is substantially 'W' shaped, similar to that of FIG. 9, where the two end portions extend to nearly the length of the middle section. System 20 also includes an insert 30, and a bonding material 40. Insert 30, as illustrated in FIG. 10, is disposed within carrier 22, shaped, substantially conforming to the shape of rib 24. As shown in FIG. 10, insert 30 covers a substantial portion of the surface area of rib 24. Again, insert 30 can be a formed metal plate, and can also be a formed fiber mat. Bonding material 40 is again disposed in at least three locations, namely on a section of insert 30, and on sections of rib 24 in between carrier 22 and cavity walls 19.

Figure 11:
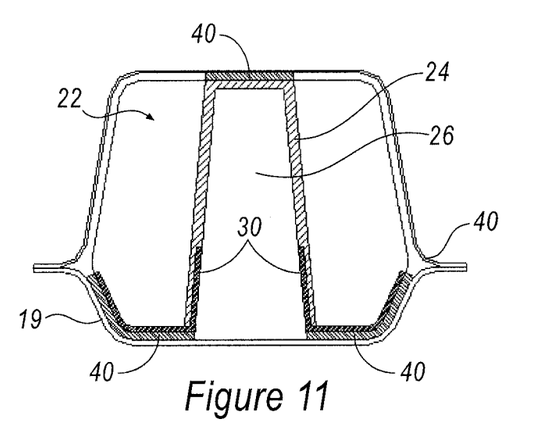

FIG. 11 illustrates yet another example of a reinforcement system 20, where carrier 22 includes a longitudinal rib 24 that is also substantially 'U' shaped. System 20 also includes at least two inserts 30, and at least three locations of bonding material 40. Inserts 30, as illustrated in FIG. 11, are substantially 'U' shaped and configured in an opposing orientation to that of rib 24. Inserts 30 are also configured to mate with the extended portions of rib 24. Inserts 30 are secured to rib 24 such that one side of each 'U' shaped insert 30 extends outwardly, away from an interior section of carrier 22, and extends toward a cavity wall 19, as illustrated in FIG. 11. Further, as illustrated in FIG. 11, inserts 30 cover only a minor portion of the surface area of rib 24. Again, inserts 30 can be a formed metal plate, and can also be formed fiber mats. Bonding material 40 is again disposed in at least three locations, namely on a sections of insert 30 in between inserts 30 and cavity walls 19, and on sections of rib 24 in between carrier 22 and cavity walls 19.

Figure 12:
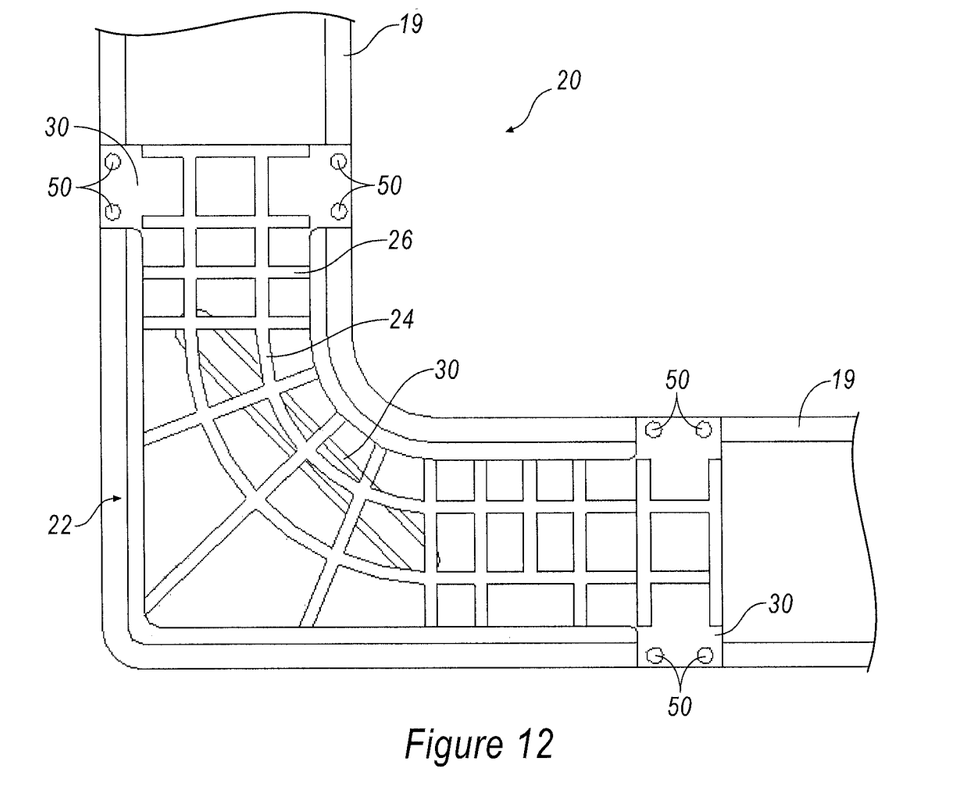
FIG. 12 is a side view of a structural reinforcement system disposed in an elbowed portion of a node.

FIG. 12 illustrates an elbowed portion of a node within a vehicle frame. A node submitted to a load, such as A-pillar 12 receiving a frontal load, tends to rotate around y and z axes, where the y axis is a transversal axis of the vehicle, and the z axis is a vertical axis of the vehicle. To reduce or prevent such unwanted rotation, a structural reinforcement system 20 can be inserted into an elbowed portion of the node, as illustrated in FIG. 12. System 20 can include a substantially flat insert 30. Additionally, insert 30 can be shaped in an 'L', 'U', or 'S' shape. Further, insert 30 could be provided off-axis to provide additional stability and prevent such unwanted rotation.

As shown in FIG. 12, system 20 includes an insert 30 that is disposed within an 'L' shaped carrier 22. Carrier 22 includes a plurality of longitudinal ribs 24 that are interconnected to a plurality of transversal ribs 26. Of course, carrier 22 may be configured to include any number, shape, and configuration of ribs that conform to the cavity. System 20 includes a substantially 'L' shaped insert 30 that includes extensions at opposing ends for welding and fixation to cavity walls 19. Insert 30 also includes a longitudinal deformation in the middle area to increase local stiffness. The extensions of insert 30 both span the width of the cavity and can be secured to cavity walls 19 at weld points 50. The longitudinal deformation of insert 30 can be a wavy or substantially 'S' shaped formation that extends diagonally through an elbowed portion of carrier 22 within the cavity, thereby extending into both the vertical and horizontal portions of the cavity, as illustrated in FIG. 12. Carrier 22 could be overmolded over insert 30, or could be mechanically fixed on both sides insert 30 using glue, adhesive, or a mechanical fastener.

Figure 13:
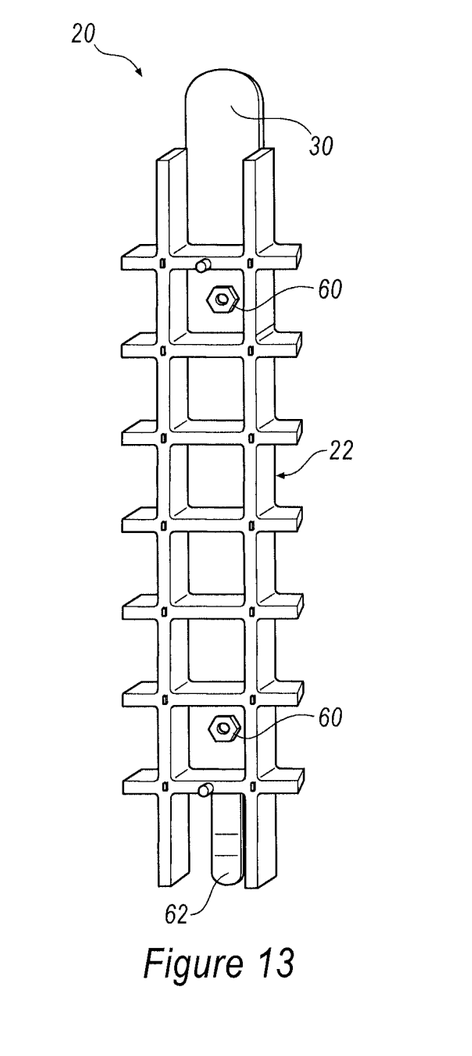
FIG. 13 is a perspective view of another structural reinforcement system that includes a fastener.
Figure 14:
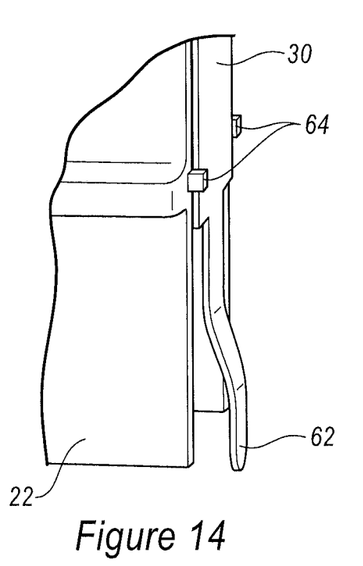
FIG. 14 is a close-up perspective view of the lower portion of the structural reinforcement system shown in FIG. 13.

FIG. 13 is a perspective view of another structural reinforcement system 20. As illustrated in FIG. 13, system 20 includes a carrier 22, an insert 30 extending beyond the overall length of carrier 22, and a bonding material (not shown). As illustrated, insert 30 can include one or more nuts 60 that can be used to secure system 20 to a cavity wall 19, and can also be used as a fixation point for an additional structural element at the opposite side of cavity wall 19. For example, nut 60 can be welded to insert 30 and configured to mate with a corresponding bolt that can secure an additional structural element at the opposite side of cavity wall 19. Typical structural elements can include door hinges, door strikers, seat belt attachments, etc. Of course, other types of fasteners could also be used as well, such as screws, nuts and bolts, hooks, pins, etc. Additionally, insert 30 may include an extension 62 that is configured to mate with a corresponding slot within a cavity, thereby facilitating easy manipulation and placement of system 20 within a cavity. An extension can be a flanged metal extension that is configured to mate with a corresponding slot, as further illustrated in FIG. 14. Additionally, as illustrated in FIG. 14, insert 30 may be secured to carrier 22 using guides 64. Guides 64 may be integral portions of carrier 22 that can be used to maintain insert 30 in place using frictional forces, such as the small protrusions illustrated in FIG. 14.

In certain configurations, it may be desirable to maintain an insulation layer between insert 30 and a cavity wall 19. For example, when cavity wall 19 is made from aluminum and insert 30 is made from steel, corrosion can occur where the two metals interface, commonly known as a "battery effect." As described above, in such a scenario where it may be desirable to provide a buffer or insulation layer between two elements, system 20 can be configured with a layer of overmolded plastic, bonding material 40, or an adhesive. As will be appreciated, such a configuration can limit the amount of metal on metal contact.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application.

We claim:

1. A structural reinforcement comprising:
   i) an elongated rigid carrier having a longitudinal axis;
   ii) a bonding material; and
   iii) an insert aligned generally parallel with the longitudinal axis and located within a contemplated impact deformation region of the rigid carrier, wherein the insert is made of a material that is dissimilar from and has a higher tensile strength than the material of the rigid carrier so that upon impact in the impact deformation region the severity of deformation is reduced as compared to a part without the insert;

wherein the elongated rigid carrier, the bonding material, and the insert are present in a cavity defined by a plurality of cavity walls, wherein the insert is shaped to substantially conform to the shape of the cavity.

2. The structural reinforcement of claim 1, wherein the insert includes a fastening mechanism that fastens the insert to a vehicle structure or to the rigid carrier.

3. The structural reinforcement of claim 1, wherein the insert is made of a metallic material.

4. The structural reinforcement of claim 3, wherein the metallic material is steel and/or aluminum.

5. The structural reinforcement of claim 1, wherein the insert is substantially covered by the rigid carrier, the bonding material, or both.

6. The structural reinforcement of claim 1, wherein the rigid carrier includes a curved first surface that is in contact with a curved surface of the insert.

7. The structural reinforcement of claim 1, wherein the insert is a composite material.

8. The structural reinforcement of claim 1, wherein the insert has an outer surface and at least a portion of the outer surface is in contact with the bonding material.

9. The structural reinforcement of claim 1, further comprising a second insert, wherein the second insert is arranged in the cavity such that the second insert is not in direct contact with the first insert or any of the cavity walls.

10. The structural reinforcement of claim 1, wherein the insert is a fiber mat.

11. A structural reinforcement comprising:
  i) an elongated rigid carrier having a longitudinal axis, a curved first surface, and including one or more ribs;
  ii) a bonding material located adjacent to the one or more ribs; and
  iii) an insert aligned generally parallel with the longitudinal axis and located within a contemplated impact deformation region of the rigid carrier, wherein the elongated rigid carrier and the insert are present in a cavity defined by a plurality of cavity walls, wherein the insert is made of a material that is dissimilar from the material of the rigid carrier, wherein the insert is made of a metallic material, wherein the insert is shaped to substantially conform to the shape of the cavity.

12. The structural reinforcement of claim 11, wherein the insert has a generally curved or U-shaped profile.

13. The structural reinforcement of claim 11, wherein the rigid carrier is a metal part, a composite part, a polymeric part, or any combination thereof.

14. The structural reinforcement of claim 11, wherein the ductility of the rigid carrier is less than the ductility of the insert.

15. The structural reinforcement of claim 11, wherein the bonding material is arranged such that the insert has one or more visible exposed surfaces.

16. The structural reinforcement of claim 11, wherein the rigid carrier, the insert, or both, contain a mechanical interlocking mechanism.

17. A structural reinforcement comprising:
  i) a rigid carrier including a curved first surface and one or more ribs;
  ii) a bonding material located adjacent to the one or more ribs;
  iii) an insert having a generally curved or U-shaped profile and located within a contemplated impact deformation region of the structural reinforcement, wherein the insert is made of a metallic material, wherein:
    a. the insert is made of a material that is dissimilar from the material of the rigid carrier; and
    b. the ductility of the rigid carrier is greater than the ductility of the insert;
  iv) a fastening mechanism that fastens at least one of the rigid carrier and the insert to a vehicle structure, wherein the insert is present in a cavity defined by a plurality of cavity walls, wherein the insert is shaped to substantially conform to the shape of the cavity.

18. The structural reinforcement of claim 3, wherein the metallic material is selected from steel, aluminum, titanium, nickel, magnesium, an alloy, a transition metal or any combination thereof.

* * * * *